(12) United States Patent
Lee et al.

(10) Patent No.: US 10,844,743 B2
(45) Date of Patent: Nov. 24, 2020

(54) METHOD FOR TURBOCHARGER KEY-OFF COOLING CONTROL BASED ON ENGINE LOAD, AND ENGINE SYSTEM IMPLEMENTING THE SAME

(71) Applicants: Hyundai Motor Company, Seoul (KR); Kia Motors Corporation, Seoul (KR)

(72) Inventors: Su-Ho Lee, Gyeonggi-do (KR); Jae-Seok Choi, Gyeonggi-do (KR); Min-Young Kwon, Gyeonggi-do (KR); Jun-Ho Lee, Gyeonggi-do (KR); Yong-Hoon Kim, Seoul (KR); Yang-Geol Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 47 days.

(21) Appl. No.: 16/194,829

(22) Filed: Nov. 19, 2018

(65) Prior Publication Data
US 2019/0186292 A1 Jun. 20, 2019

(30) Foreign Application Priority Data
Dec. 18, 2017 (KR) .................. 10-2017-0173974

(51) Int. Cl.
*F01D 25/12* (2006.01)
*F01P 3/20* (2006.01)
*F02C 6/12* (2006.01)

(52) U.S. Cl.
CPC .............. *F01D 25/12* (2013.01); *F01P 3/20* (2013.01); *F02C 6/12* (2013.01); *F01P 2060/12* (2013.01); *F05D 2220/40* (2013.01); *F05D 2260/20* (2013.01)

(58) Field of Classification Search
CPC ......... F01D 25/12; F01P 3/20; F01P 2060/12; F02C 6/12; F05D 2220/40; F05D 2260/20
USPC .................................. 60/605.3; 417/407–409
See application file for complete search history.

(56) References Cited

U.S. PATENT DOCUMENTS

| 4,665,319 | A | * | 5/1987 | Seepe | F02B 29/0443 290/1 B |
|---|---|---|---|---|---|
| 4,977,743 | A | * | 12/1990 | Aihara | F02B 29/0443 60/605.3 |
| 2015/0147197 | A1 | * | 5/2015 | Chu | F01P 3/20 417/228 |
| 2015/0369179 | A1 | * | 12/2015 | Hotta | F01P 3/10 60/599 |

(Continued)

FOREIGN PATENT DOCUMENTS

| DE | 2610378 A1 | * | 9/1977 | .............. F01P 3/20 |
|---|---|---|---|---|
| JP | 60228729 A | * | 11/1985 | .............. F01P 3/20 |

(Continued)

*Primary Examiner* — Thai Ba Trieu
(74) *Attorney, Agent, or Firm* — Mintz Levin Cohn Ferris Glovsky and Popeo, P.C.; Peter F. Corless (57) ABSTRACT

A method for turbocharger key-off cooling control may include performing turbocharger key-off cooling control based on engine load for circulating engine coolant to a turbocharger cooling line when high cooling performance of a vehicle is checked by a coolant temperature and an oil temperature at which a turbocharger controller does not require operation of an auxiliary electric water pump when an engine is stopped.

15 Claims, 4 Drawing Sheets

(56) References Cited

U.S. PATENT DOCUMENTS

2016/0201548 A1* 7/2016 Moscherosch ............ F01P 3/02
  123/41.02
2018/0320577 A1* 11/2018 Eisenschenk ............. F01P 3/20
2020/0116071 A1* 4/2020 Lee .......................... F01P 7/16

FOREIGN PATENT DOCUMENTS

| JP | 2014015885 A | * | 1/2014 | .......... F02B 29/0443 |
|----|--------------|---|--------|--------------------------|
| KR | 10-2015-0061430 A | | 6/2015 | |

* cited by examiner

METHOD FOR TURBOCHARGER KEY-OFF COOLING CONTROL BASED ON ENGINE LOAD, AND ENGINE SYSTEM IMPLEMENTING THE SAME

CROSS-REFERENCE TO RELATED APPLICATION(S)

This application claims under 35 U.S.C. § 119(a) the benefit of Korean Patent Application No. 10-2017-0173974, filed on Dec. 18, 2017, the entire contents of which are incorporated herein by reference.

BACKGROUND

(a) Technical Field

Exemplary embodiments of the present disclosure relate to turbocharger cooling control, more particularly, to an engine system that controls cooling of a turbocharger based on an engine load even when an engine is stopped by key-off.

(b) Description of Related Art

In general, an engine system supplied with intake air supercharged by a turbocharger includes a turbocharger cooling system to cool the turbocharger when an engine is stopped (engine key-off).

The reason is because noise occurs due to evaporation of coolant in the turbocharger when the engine is stopped immediately after a vehicle is driven at high load, but vibration and rattle typically occur while coolant is introduced into the hot turbocharger when the engine is started.

To this end, the turbocharger cooling system includes a turbocharger coolant line, an auxiliary electric water pump, and a turbocharger cooling controller. Turbocharger key-off cooling control is performed when the engine is stopped by engine key-off. The auxiliary electric water pump is a low-capacity electric water pump that produces a flow of coolant in the turbocharger when the engine is stopped, and replaces a mechanical water pump that is stopped together when the engine is stopped.

For example, the turbocharger key-off cooling control is a temperature-based method of monitoring a coolant temperature and an engine oil temperature when an engine is stopped by key-off while a vehicle is traveling, of determining a time of operation of an auxiliary electric water pump under a low outside air temperature condition that the time of operation is limited, and of operating the auxiliary electric water pump for the determined time of operation.

Thus, the temperature-based turbocharger key-off cooling control causes a flow of coolant to be formed to protect the turbocharger from thermal damage when the engine is stopped, thereby preventing boiling noise (i.e., noise caused when the coolant introduced into the hot turbocharger and subsequently boils and overflows) while securing the durability of the turbocharger.

However, the temperature-based turbocharger key-off cooling control causes the auxiliary electric water pump to be operated according to the temperatures of coolant and engine oil, which may lead to a control mismatch between the stop of the engine and the operation of the auxiliary electric water pump.

For example, the control mismatch refers to a state in which the auxiliary electric water pump is not operated even when the engine is stopped. This occurs because the auxiliary electric water pump must be operated to supply coolant to the turbocharger when the engine is suddenly stopped in the state in which the load of the engine is increased due to high-load uphill driving, but it is not operated when the monitored temperatures of coolant and oil are low even during high-load driving.

Hence, it is difficult to optimally protect the turbocharger from thermal damage by the temperature-based turbocharger cooling control even though the auxiliary electric water pump is used for the vehicle including the engine system with high cooling performance. In particular, limitations of this control method are especially prevalent at a time that the vehicle is required to have high cooling performance.

SUMMARY

An embodiment of the present disclosure is directed to an engine system and a method for turbocharger key-off cooling control, which maintains a supply of coolant to a turbocharger by operating an auxiliary electric water pump according to an engine load when an engine is stopped, thereby protecting the turbocharger from thermal damage, durability deterioration, and noise occurrence, and which operates the auxiliary electric water pump by determining a time of operation thereof according to an average fuel consumption of the engine load even in a high cooling performance vehicle in which a coolant temperature and an oil temperature are kept low during high-load driving.

In accordance with an embodiment of the present disclosure, a method for turbocharger key-off cooling control includes turbocharger key-off cooling control based on engine load for determining, by a turbocharger controller, a first auxiliary electric water pump (EWP) operation time A of a cooling water temperature and an oil temperature and a second EWP operation time B of the cooling water temperature and a fuel consumption, and then operating, by the turbocharger controller, an auxiliary electric water pump to circulate engine coolant to a turbocharger cooling line when a final operation time as the maximum value between the first EWP operation time A and the second EWP operation time B is selected.

The engine may be stopped by key-off immediately after engine load driving. The engine coolant may be circulated by operating a cooling fan of the auxiliary electric water pump.

The turbocharger key-off cooling control based on engine load is started when high cooling performance of a vehicle is checked by the coolant temperature and the oil temperature at which the turbocharger controller does not require operation of the auxiliary electric water pump when an engine is stopped.

The turbocharger key-off cooling control based on engine load may be performed by (A) vehicle cooling performance distinction control in which the high cooling performance is checked, (B) high cooling performance vehicle control in which the final operation time is calculated to operate the auxiliary electric water pump when the high cooling performance is checked, and (C) the circulation of the engine coolant by operating the auxiliary electric water pump for the final operation time.

The vehicle cooling performance distinction control may be divided into (a-1) checking an engine load driving condition before the engine is stopped, (a-2) respectively setting a detection value of the coolant temperature and a detection value of the oil temperature as a coolant temperature when the engine is operated and an oil temperature when the engine is operated, (a-3) checking key-off for the engine stop, and (a-4) checking the high cooling performance by the coolant temperature when the engine is operated and the oil temperature when the engine is operated.

In the vehicle cooling performance division control, the coolant temperature when the engine is operated and the oil temperature when the engine is operated may be respectively used as thresholds, and a condition less than the thresholds may be used to check the high cooling performance. The coolant temperature when the engine is operated may be 90° C. set as the threshold, and the oil temperature when the engine is operated may be 100° C. set as the threshold.

The high cooling performance vehicle control may be divided into (b-1) dividing calculation of the final operation time into the cooling water temperature and the oil temperature application and the cooling water temperature and the fuel consumption application, (b-2) respectively setting a detection value of the coolant temperature and a detection value of the oil temperature as a coolant temperature when the engine is stopped and an oil temperature when the engine is stopped in the cooling water temperature and the oil temperature application, (b-3) setting an average fuel consumption of the auxiliary electric oil pump in the cooling water temperature and the fuel consumption application, (b-4) calculating a temperature-based operation time according to the cooling water temperature and the oil temperature application and a fuel-based operation time according to the cooling water temperature and the fuel consumption application, and (b-5) defining the temperature-based operation time as the first EWP operation time A and the fuel-based operation time as the second EWP operation time B, and then using the final operation time as the maximum value between the first EWP operation time A and the second EWP operation time B In the high cooling performance vehicle control, the coolant temperature when the engine is stopped and the oil temperature when the engine is stopped may be respectively used as thresholds, and a condition less than the thresholds may be calculated as the temperature-based operation time. The coolant temperature when the engine is stopped may be 95° C. set as the threshold, and the oil temperature when the engine is stopped may be 110° C. set as the threshold. The average fuel consumption may be used as a threshold, and a condition equal to or more than the threshold may be calculated as the fuel-based operation time. The average fuel consumption may be 6 ml/s set as the threshold.

When the high cooling performance is not checked, it may be changed to turbocharger key-off cooling control based on temperature for circulating the engine coolant to the turbocharger cooling line.

The turbocharger key-off cooling control based on temperature may be performed by (D) respectively setting a detection value of the coolant temperature and a detection value of the oil temperature as a coolant temperature when the engine is stopped and an oil temperature when the engine is stopped, (E) calculating a temperature-based operation time based on the coolant temperature when the engine is stopped and the oil temperature when the engine is stopped, (F) using a final operation time by application of an outside air temperature weight according to the outside air temperature detected for the temperature-based operation time, and (F) circulating the engine coolant for the final operation time.

In accordance with another embodiment of the present disclosure, an engine system includes a turbocharger controller for detecting an engine RPM, ignition on or off, a coolant temperature, an oil temperature, and an outside air temperature as system information and for division into turbocharger key-off cooling control based on engine load, in which engine coolant circulation in a turbocharger cooling line when an engine is stopped is performed in high cooling performance of a vehicle that does not require operation of an auxiliary electric water pump by the coolant temperature and the oil temperature, and turbocharger key-off cooling control based on temperature in which the engine coolant circulation is performed in normal cooling performance of the vehicle that requires the operation of the auxiliary electric water pump.

The turbocharger controller may include a data input unit, and the data input unit may detect an accelerator pedal pressing amount, a vehicle speed, the engine RPM, the ignition on or off, the coolant temperature, the oil temperature, and the outside air temperature as the system information.

The turbocharger controller may include a time map based on engine load and a time map based on engine temperature, which are provided with a matching table for a cooling fan operation time of the auxiliary electric water pump for each engine load, and an outside air temperature weight map provided with an operation time weight table for the cooling fan operation time of the auxiliary electric water pump.

The time map based on engine load may be based on an average fuel consumption of the auxiliary electric water pump. The outside air temperature weight map may be based on time shortening according to matching between the outside air temperature and the operation time. The time map based on engine temperature may be based on the coolant temperature and the oil temperature.

In accordance with a further embodiment of the present disclosure, a non-transitory computer readable medium containing program instructions executed by a processor includes: program instructions that determine a first auxiliary electric water pump (EWP) operation time of a cooling water temperature and an oil temperature and a second EWP operation time B of the cooling water temperature and a fuel consumption; and program instructions that operate an auxiliary electric water pump to circulate engine coolant to a turbocharger cooling line when a final operation time as the maximum value between the first EWP operation time and the second EWP operation time is selected.

DESCRIPTION OF SPECIFIC EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogenpowered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Exemplary embodiments of the present disclosure will be described below in more detail with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Throughout the disclosure, like reference numerals refer to like parts throughout the various figures and embodiments of the present disclosure.

Figure 1:
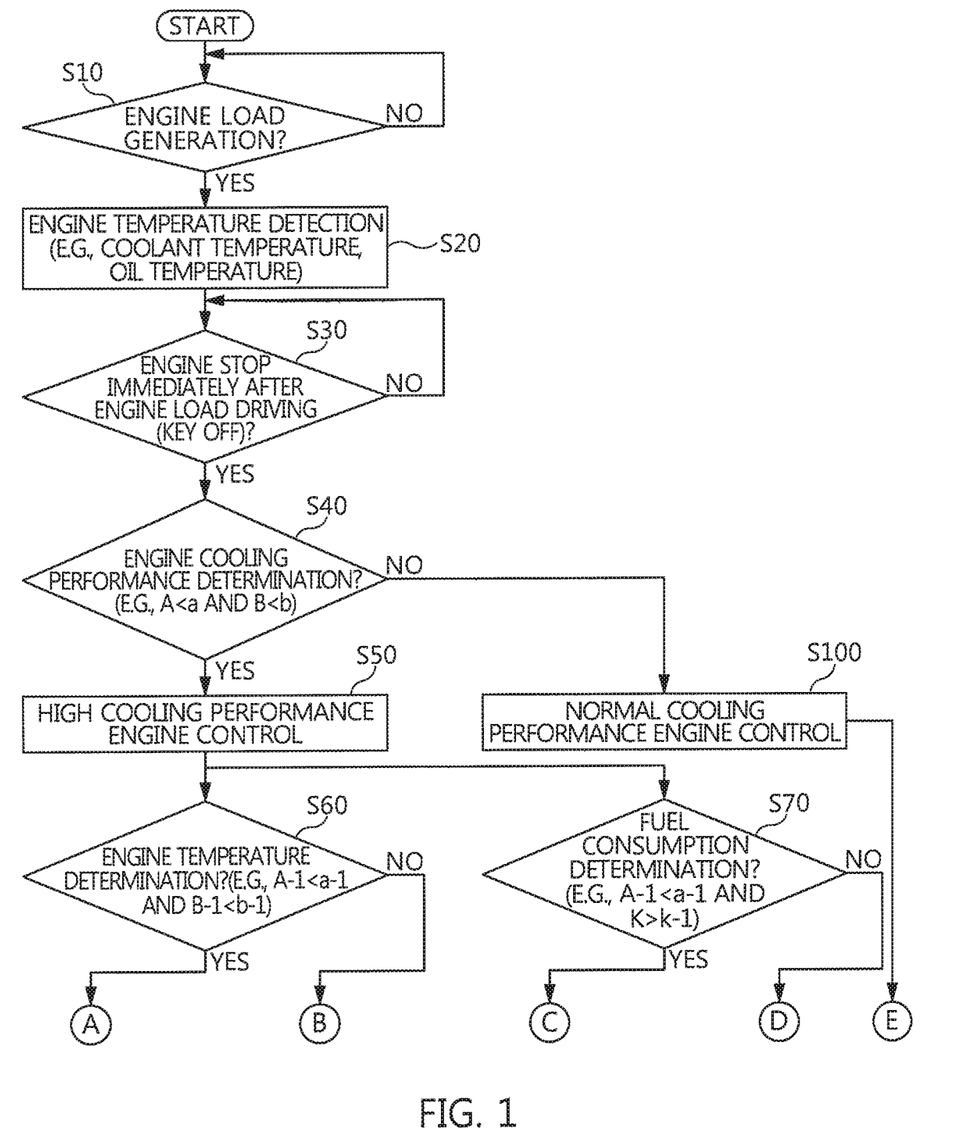
FIGS. 1 and 2 are flowcharts illustrating a method for turbocharger key-off cooling control based on engine load according to the present disclosure.
Figure 2:
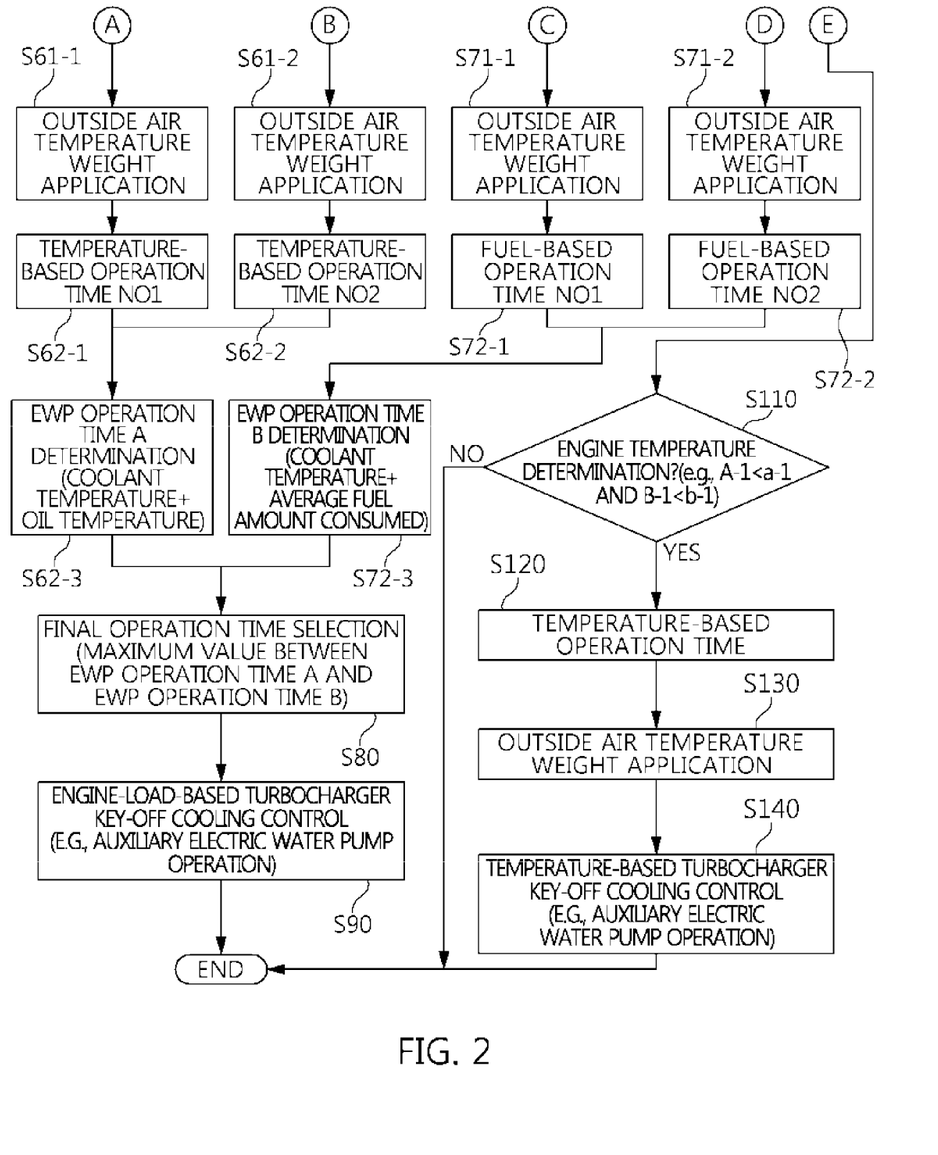

Referring to FIGS. 1 and 2, a method for turbocharger key-off cooling control based on engine load according to the present disclosure performs vehicle cooling performance distinction control that determines a high cooling performance vehicle and a normal cooling performance vehicle when an engine is stopped (key-off) after engine load driving (S10 to S40). The turbocharger cooling control method performs, based on the vehicle cooling performance division control, turbocharger key-off cooling control based on engine load (S90) after controlling the high cooling performance vehicle (S50 to S80) or turbocharger key-off cooling control based on temperature (S140) after controlling the normal cooling performance vehicle (S100 to S130).

The term "high cooling performance vehicle" as used herein is defined as a vehicle with performance enabling a coolant temperature and an oil temperature to be lowered to a temperature that is not required to operate an auxiliary electric water pump when an engine is suddenly stopped after high-load uphill driving, and the term "normal cooling performance vehicle" is defined as a vehicle with performance enabling a coolant temperature and an oil temperature to be maintained at high temperature that is required to operate an auxiliary electric water pump when an engine is suddenly stopped after high-load uphill driving.

Especially, the turbocharger key-off cooling control based on engine load (S50 to S90) is characterized in that a severe thermal damage condition is determined regardless of a coolant temperature and a time of operation of an auxiliary electric water pump (EWP) is controlled according to an outside air temperature and a coolant temperature by introduction of a fuel consumption concept representing an engine load, compared to the turbocharger key-off cooling control based on temperature (S100 to S140).

Therefore, the method for turbocharger key-off cooling control based on engine load is suitable for a key-off cooling fan operation logic based on fuel consumption for prevention of thermal damage when an engine key is turned off at a low coolant temperature while the vehicle having the auxiliary electric water pump is driven in a circuit and at high constant speed or is accelerated or decelerated.

Figure 3:
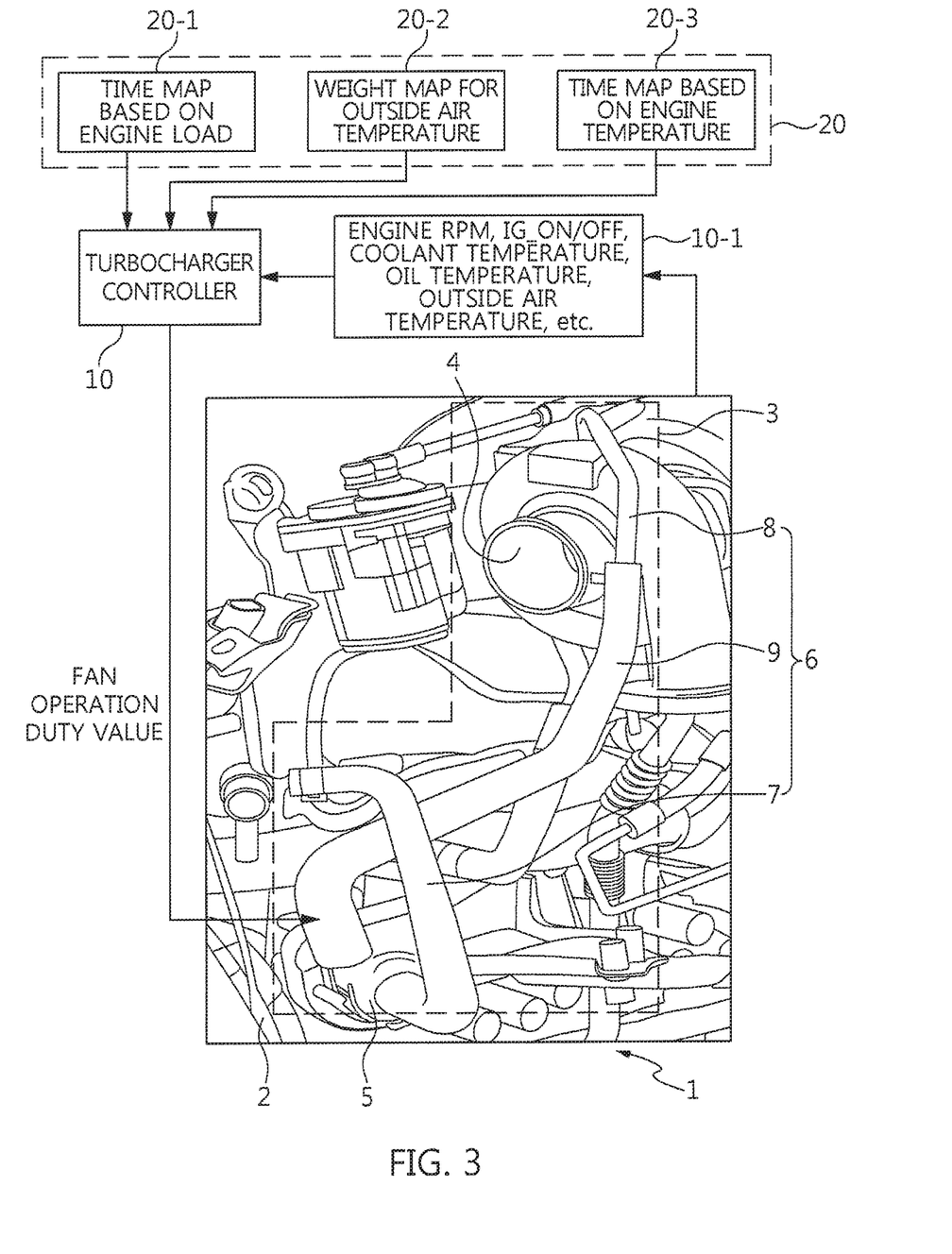
FIG. 3 is an example of an engine system for implementing the turbocharger key-off cooling control based on engine load according to the present disclosure.

Referring to FIG. 3, an engine system 1 includes an engine 2 to which an engine coolant circuit 1-1 (see FIG. 4) is applied, a turbocharger cooling system 3, and a turbocharger controller 10.

In particular, the turbocharger cooling system 3 includes a turbocharger 4, an auxiliary electric water pump 5, and a turbocharger cooling circuit 6.

For example, the turbocharger 4 supercharges fresh air supplied to the engine. The auxiliary electric water pump 5 is a low-capacity electric water pump that produces a flow of coolant in the turbocharger when the engine is stopped, and replaces a mechanical water pump that is stopped together when the engine is stopped. The turbocharger cooling circuit 6 includes an inlet pipe 7 for supplying engine coolant from the engine coolant circuit 1-1 to the turbocharger 4, a coolant feed pipe 8 for discharging the engine coolant from the turbocharger 4, and an outlet pipe 9 for returning the engine coolant discharged from the turbocharger 4 to the engine coolant circuit 1-1.

Therefore, the turbocharger 4, the auxiliary electric water pump 5, and the turbocharger cooling circuit 6 of the turbocharger cooling system 3 are components of a typical turbocharger cooling system.

In detail, the turbocharger controller 10 outputs control duty signals to implement vehicle cooling performance distinction control and turbocharger key-off cooling control based on engine load (i.e., engine load-based turbocharger key-off cooling control) and turbocharger key-off cooling control based on temperature of turbocharger (i.e., temperature-based turbocharger key-off cooling control), by using an engine RPM, IG_ON/OFF, a coolant temperature, an oil temperature, an outside air temperature, etc. as system information of the engine system 1. To this end, the turbocharger controller 10 includes a data input unit 10-1 and a fan control map 20.

For example, the data input unit 10-1 detects an accelerator pedal pressing amount, a vehicle speed, an engine RPM, IG_ON/OFF, a coolant temperature, an oil temperature, an outside air temperature, etc. read as system information by the turbocharger controller 10. The fan control map 20 is divided into a time map based on engine load 20-1 used for the turbocharger key-off cooling control based engine load (S50 to S90) and the turbocharger key-off cooling control based temperature (S100 to S140), an outside air temperature weight map 20-2, and a time map based on engine temperature 20-3 used for the turbocharger key-off cooling control based on temperature (S100 to S140). Each of the time map based on engine load 20-1 and the time map based on engine temperature 20-3 provides a matching table for the cooling fan operation time of the auxiliary electric water pump 50 for each engine load, and the outside air temperature weight map 20-2 provides an operation time weight table.

Hereinafter, the method for turbocharger key-off cooling control based engine load will be described in detail with reference to FIGS. 3 and 4. In this case, the turbocharger controller 10, which is connected to the data input unit 10-1, the time map based on engine load 20-1, the outside air temperature weight map 20-2, and the time map based engine temperature 20-3, is a control subject. The cooling fan, which is included in the auxiliary electric water pump 5 of the turbocharger cooling system 3 according to the cooling fan operation duty value using the control duty table of the turbocharger controller 10, is a control target.

The turbocharger controller 10 performs vehicle cooling performance division control, and the vehicle cooling performance distinction control (S10 to S40) is divided into an engine load driving condition check step (S10), an engine temperature detection step (S20), an engine stop detection step immediately after engine load driving (S30), and a vehicle cooling performance determination step (S40).

Referring to FIG. 3, the turbocharger controller 10 reads an accelerator pedal pressing amount, a vehicle speed, an engine RPM, IG_ON/OFF, a coolant temperature, an oil temperature, an outside air temperature, etc. as input data, and determines the engine load by detection values of the accelerator pedal pressing amount, the vehicle speed, and the engine RPM. In this case the engine load includes high-speed high-load uphill driving cause of a high-load driving condition. In addition, the turbocharger controller 10 determines engine stop by an IG_OFF signal. The turbocharger controller 10 determines vehicle cooling performance using the coolant and oil temperatures detected as engine temperature by the following equation:

$A<a$ and $B<b$.  vehicle cooling performance determination:

Here, ">" is a sign of inequality indicative of the size between two values, "A" is a coolant temperature when the engine is operated, "a" is a threshold set as about 90° C., "B" is an oil temperature when the engine is operated, and "b" is a threshold set as about 100° C.

If the condition, in which the coolant temperature (A) is less than the threshold (a) when the engine is operated and at the same time the oil temperature (B) is less than the threshold (b) when the engine is operated, is satisfied, the turbocharger controller 10 determines that the vehicle is a high cooling performance vehicle. On the other hand, if the condition is not satisfied, the turbocharger controller 10 determines that the vehicle is a normal cooling performance vehicle.

Next, the turbocharger controller 10 performs high cooling performance vehicle control (S50 to S80), and the high cooling performance vehicle control is divided into an engine temperature application step (S60 to S62-3), a fuel consumption application step (S70 to S72-3), and a final operation time selection step (S80).

FIG. 2 is an example of tables established by the time map based on engine load 20-1, the outside air temperature weight map 20-2, and the time map based on engine temperature 20-3 used for the high cooling performance vehicle control (S50 to S80). In this case the tables include a fuel consumption, an average value of fuel consumption for a certain time, an instant fuel consumption, and a time for calculating the fuel consumption.

For example, the table of the time map based on engine load 20-1 is established by matching the engine load based on high-speed high-load uphill driving and the engine temperature based on coolant temperature/oil temperature with the cooling fan operation time of the auxiliary electric water pump 5. Therefore, the table is used in the turbocharger controller 10 for calculating the cooling fan operation time of the auxiliary electric water pump 5 according to the average fuel consumption after key-off.

For example, the table of the outside air temperature weight map 20-2 is established by matching the time calculated by the operation time that can be reduced according to the outside air temperature condition. Therefore, the table is used in the turbocharger controller 10 for calculating a time weight to the cooling fan operation time based on engine load and the cooling fan operation time based on engine temperature.

For example, the table of the time map based on engine temperature 20-3 is established by matching the engine temperature based on coolant temperature/oil temperature with the cooling fan operation time of the auxiliary electric water pump 5. Therefore, the table is used in the turbocharger controller 10 for calculating the cooling fan operation time of the auxiliary electric water pump 5 according to the coolant temperature and the oil temperature as in an existing table.

In particular, the engine temperature application step (S60 to S62-3) includes an engine temperature determination step (S60), an outside air temperature weight application step (S61-1), a temperature-based operation time No. 1 calculation step (S62-1), an outside air temperature weight application step (S61-2), a temperature-based operation time No. 2 calculation step (S62-2), and a "first" auxiliary electric water pump (EWP) operation time A (a coolant temperature+an oil temperature) selection step (S62-3). On the other hand, the fuel consumption application step (S70 to S72-3) includes a fuel consumption determination step (S70), an outside air temperature weight application step (S71-1), a fuel-based operation time No. 1 calculation step (S72-1), an outside air temperature weight application step (S72-1), a fuel-based operation time No. 2 calculation step (S72-2), and a "second" auxiliary electric water pump (EWP) operation time B (a coolant temperature+an average fuel amount consumed) selection step (S72-3). The turbocharger controller 10 uses the following equation for engine temperature determination (S60) and fuel consumption determination (S70):

$A-1<a-1$ and $B-1<b-1$; and  engine temperature determination:

$A-1<a-1$ and $K>K-1$  fuel consumption determination:

Here, ">" is a sign of inequality indicative of the size between two values, "A-1" is a coolant temperature when the engine is operated, "a-1" is a threshold set as about 95° C., "B-1" is an oil temperature when the engine is operated, "b-1" is a threshold set as about 110° C., "K" is an average fuel amount consumed during the operation of the auxiliary electric water pump 5 for the cooling of the turbocharger 4, and "K-1" is a threshold set as about 6 ml/s.

If the condition, in which the coolant temperature (A-1) is less than the threshold (a-1) when the engine is operated and at the same time the oil temperature (B-1) is less than the threshold (b-1) when the engine is operated, is satisfied, the turbocharger controller 10 calculates a temperature-based operation time No. 1. On the other hand, if the condition is not satisfied, the turbocharger controller 10 calculates a temperature-based operation time No. 2. In addition, if the condition, in which the average fuel consumption (K) is equal to or more than the threshold (K-1), is satisfied, the turbocharger controller 10 calculates a fuel-based operation time No. 1. On the other hand, if the condition is not satisfied, the turbocharger controller 10 calculates a fuel-based operation time No. 2.

As a result, in the first EWP operation time A (a coolant temperature+an oil temperature) selection step (S62-3), the maximum value between the temperature-based operation time No. 1 and the temperature-based operation time No. 2 is selected, As a result, in the second EWP operation time B (a coolant temperature+an average fuel amount consumed) selection step (S72-3), the maximum value between the fuel-based operation time No. 1 and the fuel-based operation time No. 2 is selected And then, in a final operation time selection step (S80), the maximum value between the first EWP operation time A (S62-3) and the second EWP operation time B (S72-3) is selected as a final operation time.

Next, the turbocharger controller 10 performs an engine-load-based turbocharger key-off cooling control step (S90). The cooling fan of the auxiliary electric water pump 5 is operated for the final operation time so that engine coolant is circulated through the turbocharger cooling circuit 6 in the turbocharger 4.

Referring to FIG. 2, the operation time calculation logic of the turbocharger controller 10 calculates a cooling fan operation time by multiplying a reference mapping value based on coolant temperature and fuel consumption and a weight value based on outside air temperature, and the operation duty calculation logic determines a cooling fan operation duty according to the outside air temperature and the coolant temperature causing difference value in engine room cooling according to the outside air temperature. Therefore, the control duty table (or control duty map) of the turbocharger controller 10 is illustrated as a cooling fan operation duty value immediately after key-off according to the outside air temperature and the coolant temperature.

Figure 4:
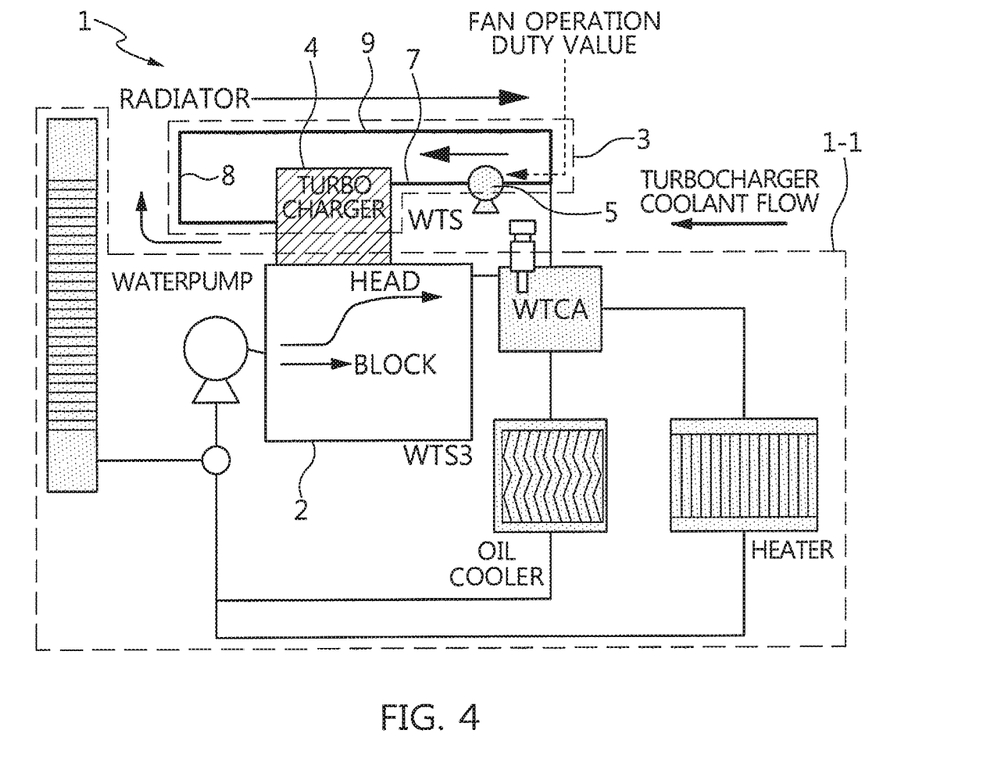
FIG. 4 is a diagram illustrating operation of a turbocharger cooling system of an engine system according to the present disclosure.

Referring to FIG. 4, since the engine 2 is stopped in the engine system 1, engine coolant is not circulated in the engine coolant circuit 1-1 whereas the engine coolant discharged from the engine 2 is circulated in the turbocharger cooling line 6 of the turbocharger cooling system 3.

To this end, the turbocharger controller 10 matches the final operation time as the maximum value between the first EWP operation time A (S62-3) and the second EWP operation time B (S72-3) in the time map based on engine load 20-1, and outputs a control duty from the control duty table (or control duty map) according to the matching value, thereby operating the cooling fan of the auxiliary electric water pump 5.

As a result, a circulation flow, in which engine coolant flows from the coolant inlet pipe 7 to the turbocharger 4 and is then discharged to the coolant outlet pipe 9 via the coolant feed pipe 8, is formed in the turbocharger cooling line 6.

Meanwhile, if the coolant temperature (A) is equal to or more than the threshold (a) when the engine is operated or if the oil temperature (B) is equal to or more than the threshold (b) when the engine is operated in the vehicle cooling performance distinction control (S10 to S40), the turbocharger controller 10 performs normal cooling performance vehicle control (S100 to S130).

The normal cooling performance vehicle control (S100 to S130) is performed by an engine temperature determination step (S110), a temperature-based operation time calculation step (S120), and an outside air temperature weight application step (S130).

The turbocharger controller 10 uses the following equation for engine temperature determination (S110):

$$A\text{-}1 < a\text{-}1 \text{ and } B\text{-}1 < b\text{-}1. \quad \text{engine temperature determination:}$$

In this case, the engine temperature determination equation uses the same factor and condition as the engine temperature determination equation of the engine temperature determination step (S60) applied to the high cooling performance vehicle control (S50 to S80).

Therefore, the temperature-based operation time No. 1 or the temperature-based operation time No. 2 selected in the final operation time selection step (S80) is applied to the normal cooling performance vehicle control (S100 to S130). Thus, the maximum between the temperature-based operation time No. 1 and the temperature-based operation time No. 2 is used as a final operation time.

Next, the turbocharger controller 10 performs a temperature-load-based turbocharger key-off cooling control step (S140). This means that the cooling fan of the auxiliary electric water pump 5 is operated by setting the maximum between the temperature-based operation time No. 1 and the temperature-based operation time No. 2 as the final operation time and outputting the control duty of the control duty table (or control duty map) according to the matching value of the time map based on engine temperature 20-3.

Therefore, even in the temperature-load-based turbocharger key-off cooling control (S140), a circulation flow, in which engine coolant flows from the coolant inlet pipe 7 to the turbocharger 4 and is then discharged to the coolant outlet pipe 9 via the coolant feed pipe 8, is formed in the turbocharger cooling line 6.

As described above, the method for turbocharger key-off cooling control of the engine system 1 according to the embodiment of the present disclosure is divided into the engine-load-based turbocharger key-off cooling control, in which the engine coolant circulation in the turbocharger cooling line 6 when the engine is stopped is performed in the high cooling performance of the vehicle that does not require the operation of the auxiliary electric water pump 5 by the coolant temperature and the oil temperature based on the detected engine RPM, IG_ON/OFF, coolant temperature, oil temperature, and outside air temperature, and the temperature-based turbocharger key-off cooling control in which the engine coolant circulation is performed in the normal cooling performance of the vehicle, to cool the turbocharger 4, thereby preventing thermal damage on the turbocharger 4 even in the high cooling performance vehicle even though the auxiliary electric water pump 5 is applied thereto.

As is apparent from the above description, the turbocharger key-off cooling control applied to the engine system of the present disclosure has the following action and effect since it is based on the engine load.

Firstly, the phenomenon in which the auxiliary electric water pump is not operated due to the control mismatch between the stop of the engine and the operation of the auxiliary electric water pump is basically resolved. Secondly, the durability of the turbocharger is enhanced since the auxiliary electric water pump is always operated when the engine is stopped by resolving the control mismatch. Thirdly, the coolant in the turbocharger is circulated without noise and vibration since the average fuel consumption of the vehicle is used to control the operation of the auxiliary electric water pump. Fourthly, the function evaluation of the turbocharger can be easily satisfied since the temperature of the bearing is decreased less than or equal to the regulation temperature by maintaining the operation of the auxiliary electric water pump. Fifthly, it is possible to prevent durability deterioration and noise occurrence since the turbocharger is protected from thermal damage by the operation of the auxiliary electric water pump even in the high cooling performance vehicle in which the coolant temperature and the oil temperature are kept low during high-load driving.

While the present disclosure has been described with respect to the specific embodiments, it will be apparent to those skilled in the art that various changes and modifications may be made without departing from the spirit and scope of the disclosure as defined in the following claims.

What is claimed is:

1. A method for a turbocharger key-off cooling control in a turbocharged engine system including an engine, a turbocharger for supplying turbocharged air to the engine for discharging exhaust gas from the engine, a turbocharger cooling system with a turbocharger cooling circuit, an auxiliary electric water pump (EWP) positioned upstream of the turbocharger, an electric water pump (EWP) positioned upstream of the engine, and an oil cooler, the method comprising:
   controlling the turbocharger key-off cooling control based on engine load with a turbocharger controller when the engine is stopped by key-off immediately after the engine has been running;
   determining, by the turbocharger controller, an auxiliary electric water pump (EWP) operation time A of the coolant temperature and an oil temperature of the oil cooler and an EWP operation time B of the coolant temperature and a fuel consumption; and
   operating, by the turbocharger controller, the auxiliary electric water pump to circulate engine coolant to the turbocharger cooling circuit based on a final operation time selected as a maximum value between the auxiliary EWP operation time and the EWP operation time in a time map.

2. The method of claim 1, wherein, with the turbocharger key-off cooling control based on engine load being carried out by a circulation flow through a coolant inlet pipe, a coolant feed pipe and a coolant outlet pipe with the engine coolant driven by the auxiliary electric water pump, the method further comprising:
   determining a high cooling performance performed by vehicle cooling performance distinction control by the turbocharger controller; and
   operating the auxiliary electric water pump to reach the high cooling performance vehicle control in which the final operation time is calculated by the turbocharger controller.

3. The method of claim 2, wherein the vehicle cooling performance distinction control comprises:
   checking an engine load driving condition before the engine is stopped by the turbocharger controller;
   respectively setting a detection value of the coolant temperature and a detection value of the oil temperature as the coolant temperature when the engine is operated and the oil temperature when the engine is operated by the turbocharger controller;
   checking key-off for the stopping of the engine by the turbocharger controller; and
   checking the high cooling performance by measuring the coolant temperature when the engine is operated and measuring the oil temperature when the engine is operated by the turbocharger controller,
   wherein the coolant temperature when the engine is operated and the oil temperature when the engine is operated are respectively compared to a predetermined coolant temperature and a predetermined oil temperature as thresholds to check the high cooling performance.

4. The method of claim 2, wherein the high cooling performance vehicle control comprises:
   respectively setting a measurement value of the coolant temperature and a measurement value of the oil temperature as the coolant temperature when the engine is stopped and the oil temperature when the engine is stopped by the turbocharger controller;
   calculating a temperature-based operation time according to the coolant temperature and the oil temperature and a fuel-based operation time according to the coolant temperature and the fuel consumption by the turbocharger controller; and
   defining the temperature-based operation time as the first EWP operation time A and the fuel-based operation time B as the second EWP operation time, and then selecting the final operation time as the maximum value between the first EWP operation time and the second EWP operation time by the turbocharger controller.

5. The method of claim 4, wherein the coolant temperature when the engine is stopped and the oil temperature when the engine is stopped are respectively used as thresholds of a predetermined coolant temperature and a predetermined oil temperature, and a condition less than the thresholds is calculated as the temperature-based operation time.

6. The method of claim 4, wherein an average fuel consumption is used as a threshold of a predetermined fuel consumption, and a condition equal to or more than the threshold is used as the fuel-based operation time.

7. The method of claim 1, wherein during the turbocharger key-off cooling control, the engine coolant circulates in the turbocharger cooling line.

8. The method of claim 7, wherein the turbocharger key-off cooling control comprises:
   respectively setting a measurement value of the coolant temperature and a measurement value of the oil temperature as the coolant temperature when the engine is stopped and the oil temperature when the engine is stopped by the turbocharger controller;
   calculating a temperature-based operation time based on the coolant temperature when the engine is stopped and the oil temperature when the engine is stopped by the turbocharger controller;
   using a final operation time by application of an outside air temperature weight according to a measurement value of the outside air temperature for the temperature-based operation time by the turbocharger controller; and
   circulating the engine coolant by operating the auxiliary electric water pump for the final operation time by the turbocharger controller.

9. An engine system comprising:
   an engine;
   a turbocharger for supplying turbocharged air to the engine for discharging exhaust gas from the engine;
   a turbocharger cooling system including a turbocharger cooling circuit, an auxiliary electric water pump (EWP) positioned upstream of the turbocharger, an electric water pump (EWP) positioned upstream of the engine, and an oil cooler; and
   a turbocharger controller, wherein the turbocharger controller further includes executable program instructions stored in a non-transitory processor to:
receive an engine RPM, ignition on or off, a coolant temperature, an oil temperature, and an outside air temperature from a data input unit when the engine is stopped by an engine key-off immediately after the engine has been running;
determine an auxiliary electric water pump (EWP) operation time A of the coolant temperature and an oil temperature of the oil cooler and an EWP operation time B of the coolant temperature and a fuel consumption, and
operate the auxiliary electric water pump circulating the engine coolant to the turbocharger cooling circuit based on a final operation time selected as a maximum value between the auxiliary electric EWP operation time and the EWP operation time in a time map.

10. The engine system of claim 9, wherein the turbocharger controller further includes executable program instructions to:
receive an accelerator pedal pressing amount, a vehicle speed during operation of the engine, the turbocharger, the auxiliary electric water pump, and the electric water pump.

11. The engine system of claim 9, wherein the turbocharger controller further includes executable program instructions to:
generate a time map based on engine load;
generate a time map based on engine temperature;
generate a matching table for a cooling fan operation time of the auxiliary electric water pump for the engine load; and
generate an outside air temperature weight map provided with an operation time weight table for the cooling fan operation time of the auxiliary electric water pump,
wherein the operation time weight table multiplies a reference mapping value based on the coolant temperature and a weight value of the outside air temperature.

12. The engine system of claim 11, wherein the time map based on engine load is based on a matching table for an average fuel consumption during operation of the auxiliary electric water pump.

13. The engine system of claim 11, wherein the outside air temperature weight map is based on time shortening according to matching between the outside air temperature and an operation time of the auxiliary electric water pump determined by the turbocharger controller.

14. The engine system of claim 11, wherein the time map based on engine temperature is based on the coolant temperature and the oil temperature.

15. A non-transitory computer readable medium containing program instructions executed by a processor, the computer readable medium comprising program instructions to:
receive an engine RPM, ignition on or off, a coolant temperature, an oil temperature, and an outside air temperature from a data input unit when the engine is stopped by an engine key-off immediately after the engine has been running,
determine an auxiliary electric water pump (EWP) operation time A of the coolant temperature and the oil temperature and an EWP operation time B of the coolant temperature and a fuel consumption; and
operate the auxiliary electric water pump to circulate engine coolant to a turbocharger cooling line based on a final operation time selected as a maximum value between the auxiliary EWP operation time and the EWP operation time.

* * * * *